US006405300B1

(12) United States Patent
Tremblay et al.

(10) Patent No.: US 6,405,300 B1
(45) Date of Patent: Jun. 11, 2002

(54) COMBINING RESULTS OF SELECTIVELY EXECUTED REMAINING SUB-INSTRUCTIONS WITH THAT OF EMULATED SUB-INSTRUCTION CAUSING EXCEPTION IN VLIW PROCESSOR

(75) Inventors: Marc Tremblay, Menlo Park, CA (US); William N. Joy, Aspen, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/273,602

(22) Filed: Mar. 22, 1999

(51) Int. Cl.[7] .................................................. G06F 9/44
(52) U.S. Cl. ........................... 712/24; 712/244; 703/26
(58) Field of Search ..................... 712/24, 244; 703/26

(56) References Cited

U.S. PATENT DOCUMENTS

| | | | | |
|---|---|---|---|---|
| 5,450,556 A | * | 9/1995 | Slavenburg et al. | 712/235 |
| 5,881,280 A | | 3/1999 | Gupta et al. | 712/244 |
| 6,038,652 A | | 3/2000 | Phillips et al. | 712/22 |
| 6,041,399 A | * | 3/2000 | Terada et al. | 712/24 |
| 6,065,106 A | * | 5/2000 | Deao et al. | 712/24 |

OTHER PUBLICATIONS

IBM Technical Disclosure Bulletin, vol. 36, No. 1, Jan. 1993, p. 57–58, "Addressing Mechanism For a Very Long Instruction Word Machine to Allow Recovery From Exceptions".

* cited by examiner

Primary Examiner—Kenneth S. Kim
(74) Attorney, Agent, or Firm—Park, Vaughan & Fleming LLP

(57) ABSTRACT

One embodiment of the present invention provides a system that efficiently emulates sub-instructions in a very long instruction word (VLIW) processor. The system operates by receiving an exception condition during execution of a VLIW instruction within a VLIW program. This exception condition indicates that at least one sub-instruction within the VLIW instruction requires emulation in software or software assistance. In processing this exception condition, the system emulates the sub-instructions that require emulation in software and stores the results. The system also selectively executes in hardware any remaining sub-instructions in the VLIW instruction that do not require emulation in software. The system finally combines the results from the sub-instructions emulated in software with the results from the remaining sub-instructions executed in hardware, and resumes execution of the VLIW program.

22 Claims, 3 Drawing Sheets

COMBINING RESULTS OF SELECTIVELY EXECUTED REMAINING SUB-INSTRUCTIONS WITH THAT OF EMULATED SUB-INSTRUCTION CAUSING EXCEPTION IN VLIW PROCESSOR

BACKGROUND

1. Field of the Invention

The present invention relates to the design of processors within computer systems. More specifically, the present invention relates to a method and apparatus for efficiently emulating sub-instructions in a very long instruction word (VLIW) processor.

2. Related Art

In order to increase computational performance, processor designs are beginning to move toward very long instruction word (VLIW) architectures in which multiple functional units simultaneously execute a single VLIW instruction. A VLIW instruction is typically composed of a plurality of "sub-instructions" that specify operations for individual functional units.

One problem for VLIW architectures is handling exception conditions that arise when a sub-instruction is not implemented within a hardware functional unit and must instead be emulated in software, or when a set of data inputs causes a hardware functional unit to generate an exception, such as a divide by zero condition or an overflow condition. In current VLIW architectures, even if only a single sub-instruction in a VLIW instruction generates an exception condition, all of the sub-instructions that make up the VLIW instruction must be emulated in software. This can seriously degrade computer system performance.

Furthermore, even if only a few sub-instructions generate exception conditions, the computer system must provide code to emulate all possible sub-instructions; this includes providing code for emulating sub-instructions that are already implemented in hardware. Writing code for all of these sub-instructions causes a number of problems. First, it is expensive and time-consuming to write instructions for sub-instructions that are already implemented in hardware. Second, ensuring correctness of emulation becomes a bigger problem. It is hard to ensure that even the small number of sub-instructions that are not implemented in hardware are emulated correctly in software. It is harder still to ensure that all sub-instructions, including the ones already implemented in hardware, are emulated correctly. Furthermore, providing additional routines to emulate sub-instructions uses more computer memory, which can degrade cache performance and can cause more page faults.

What is needed in a method and apparatus that eliminates the need for all of the sub-instructions in a VLIW instruction to be emulated in software when only a small number of sub-instructions from the VLIW instruction actually require emulation in software, and an efficient way to deal with exception conditions, such as an overflow.

SUMMARY

One embodiment of the present invention provides a system that efficiently emulates sub-instructions in a very long instruction word (VLIW) processor. The system operates by receiving an exception condition during execution of a VLIW instruction within a VLIW program. This exception condition indicates that at least one sub-instruction within the VLIW instruction requires emulation in software or software assistance. In processing this exception condition, the system emulates the sub-instructions that require emulation in software and stores the results. The system also selectively executes in hardware any remaining sub-instructions in the VLIW instruction that do not require emulation in software. The system finally combines the results from the sub-instructions emulated in software with the results from the remaining sub-instructions executed in hardware, and resumes execution of the VLIW program.

According to one aspect of the present invention, the emulation process includes: saving state from a plurality of registers within the VLIW processor; placing the VLIW processor into a privileged mode; and activating a trap handler to perform the emulation. Activating the trap handler may include reading an exception register that indicates which of the sub-instructions caused the exception condition, and then emulating the sub-instructions that caused the exception condition in accordance with a priority ordering.

According to one aspect of the present invention, the act of selectively executing in hardware the remaining sub-instructions that do not have to be emulated includes selectively enabling hardware functional units to execute the remaining sub-instructions. This may be accomplished by storing a pattern of enablement signals into an enablement register, wherein each bit of the enablement register indicates whether a corresponding hardware functional unit for corresponding sub-instruction is to be enabled. This pattern of enablement signals is applied to hardware functional units in the VLIW processor so that the hardware functional units execute only the enabled sub-instructions. Next, the VLIW instruction is executed so that only the remaining sub-instructions, which have not been emulated in software, are executed in hardware. After the VLIW instruction is executed, a trap is generated to in order to complete processing of the exception condition.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
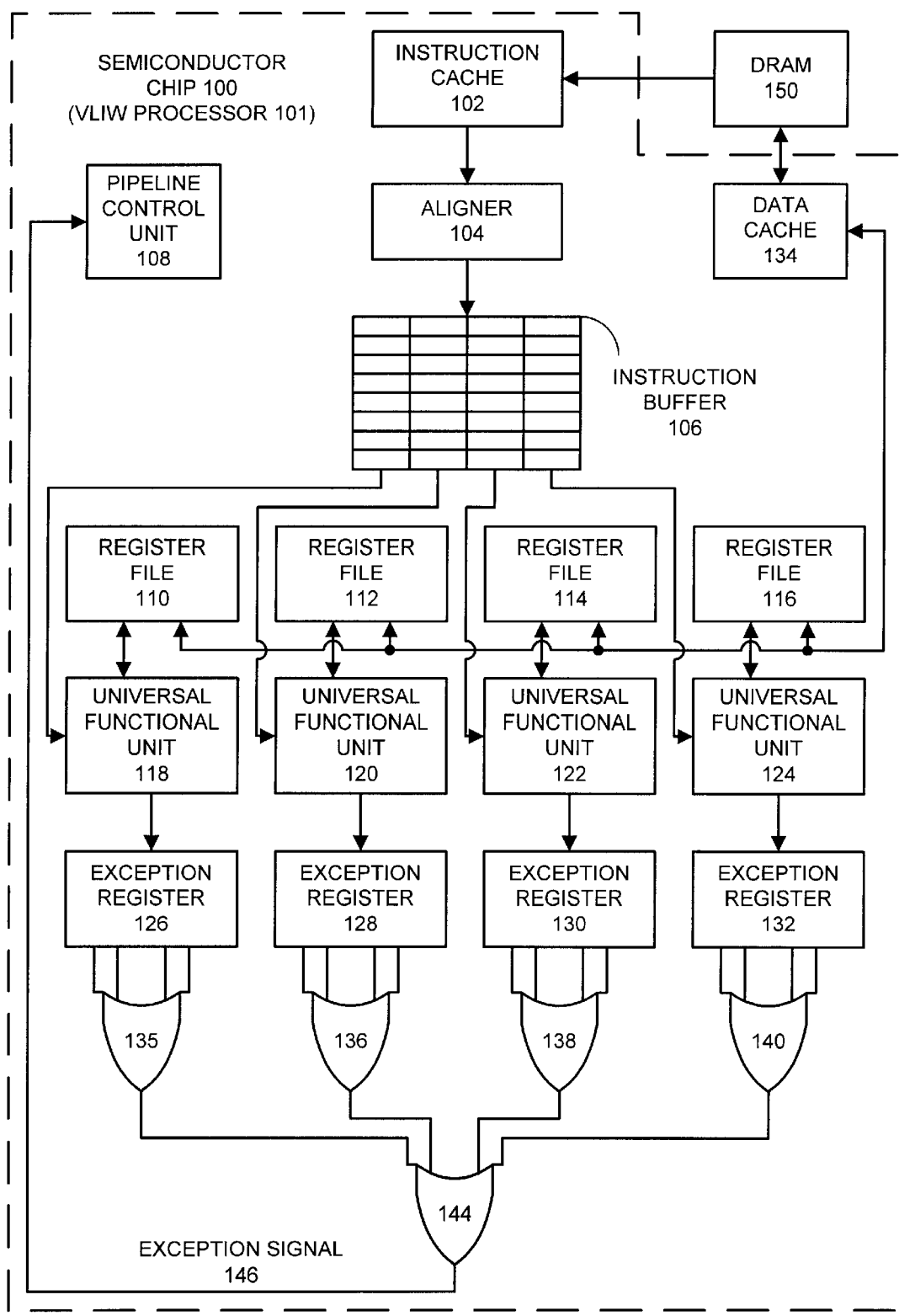
FIG. 1 illustrates a computer system that executes VLIW instructions in accordance with an embodiment of the present invention.

FIG. 1 illustrates a computer system that executes VLIW instructions in accordance with an embodiment of the present invention. The computer system illustrated in FIG. 1 includes semiconductor chip 100 coupled with dynamic random access memory (DRAM) 150. DRAM 150 may include any type of random access memory for storing code and data to be executed by VLIW processor 101 located on semiconductor chip 100.

Semiconductor chip 100 includes circuitry to implement a VLIW processor 101. This circuitry includes instruction cache 102, aligner 104, instruction buffer 106, pipeline control unit 108, data cache 134, as well as register files 110, 112, 114 and 116. VLIW processor 101 additionally includes universal functional units 118, 120, 122 and 124. These universal functional units are coupled to exception registers 126, 128, 130 and 132, respectively.

During operation of VLIW processor 101, VLIW instructions are fetched from DRAM 150 into instruction cache 102. Instruction cache 102 may include any type of cache memory for storing VLIW instructions, including a directed-mapped or a set-associative instruction cache. A VLIW instruction feeds through aligner 104 which performs alignment functions before feeding the instruction into instruction buffer 106. This alignment may be necessary for a VLIW instruction because sub-instructions within the VLIW instruction may not be properly aligned when the VLIW instruction originates from instruction cache 102. Aligner 104 ensures that sub-instructions are left-aligned, if such alignment is necessary.

Instruction buffer 106 contains storage for a plurality of VLIW instructions. Recall that each VLIW instruction is composed of a plurality of sub-instructions. The sub-instructions for a currently executing VLIW instruction feed into corresponding universal functional units 118, 120, 122 and 124.

Universal functional units 118, 120, 122 and 124 contain circuitry to perform arithmetic operations on data from register files 110, 112, 114 and 116, respectively. Universal functional units 118, 120, 122 and 124 support arithmetic operations on a number of data types including floating point, fixed point, integer and saturated data types. Saturated data types are typically used to specify control signals. A saturated variable remains at its highest value if incremented above its highest value, and remains at its lowest value if decremented below its lowest value. Thus, problems due to abrupt swings in a control signal caused by wrap around during arithmetic operations are avoided.

Universal functional units 118, 120, 122 and 124 perform a number of common arithmetic and data manipulation operations including addition, multiplication and shift operations, as well as bit extract and byte shuffle operations. Note that universal functional unit 118 differs from universal functional units 120, 122 and 124 in that it additionally handles load, store and branch instructions to facilitate flow control and data movement within VLIW processor 101.

Register files 110, 112, 114 and 116 contain data to be manipulated by associated universal functional units 118, 120, 122 and 124, respectively. A number of registers are local to register files 110, 112, 114 and 116 and a number of registers are shared between register files. In one embodiment of the present invention, a given register file contains 96 shared registers and 32 local registers out of 128 visible registers.

Data to be manipulated by a VLIW program flows from DRAM 150 into data cache 134. Data cache 134 may include any type of cache memory for storing data to be executed by VLIW processor 101, including a set associative or a direct-mapped cache. During load operations, data is transferred from data cache 134 into register files 110, 112, 114 and 116. During store operations, data is written from register files 110, 112, 114 and 116 into data cache 134, and ultimately back to DRAM 150.

Note that VLIW processor 101 illustrated in FIG. 1 is a pipelined processor. This means that at any given point in time during execution of a VLIW program, VLIW instructions are staged so that multiple VLIW instructions are concurrently executing.

Pipelined execution is controlled by pipeline control unit 108. Pipeline control unit 108 controls the movement of instructions through VLIW processor 101 and additionally controls exception conditions, such as interrupts and traps. This includes handling exception conditions where at least one sub-instruction within a VLIW instruction requires emulation in software.

When an exception condition occurs in one of the universal functional units 118, 120, 122 and 124, the exception condition causes a corresponding bit to be set in one of the corresponding exception registers 126, 128, 130 and 132, respectively. Note that there is a different bit in each exception register for each different type of exception condition. For example, one exception condition may indicate that the current sub-instruction requires emulation in software, and another exception condition may indicate that the corresponding sub-instruction caused an overflow during an arithmetic operation.

Also note that multiple exception conditions can occur during execution of a given sub-instruction. This means that multiple bits in an exception register can be set by the same sub-instruction. A series of OR gates 135, 136, 138, 140 and 144 are used to aggregate the contents of exception registers 126, 128, 130 and 132 into an single exception signal 146, which feeds into pipeline control unit 108. More specifically, the bits of exception register 126 feed into inputs of OR gate 135; the bits of exception register 128 feed into inputs of OR gate 136; the bits of exception register 130 feed into inputs of OR gate 138; and the bits of exception register 132 feed into inputs of OR gate 140. Next, the outputs of OR gates 135, 136, 138 and 140 feeds into inputs of OR gate 144. Finally, the output of OR gate 144 becomes exception signal 146, which feeds into an input of pipeline control unit 108.

Exception signal 146 is asserted whenever any of the bits in exception registers 126, 128, 130 and 132 are asserted. In response to an asserted exception signal 146, pipeline control unit 108 initiates an exception handling process. This exception handling process involves (among other things) reading exception registers 126, 128, 130 and 132 in order to determine what type of exception occurred.

Although the VLIW processor 101 illustrated in FIG. 1 resides on a single semiconductor chip, the present invention is not limited to VLIW processors that fit entirely on a single semiconductor chip, but rather applies to any type of VLIW processor, even those that span multiple semiconductor chips.

VLIW Instruction

Figure 2:
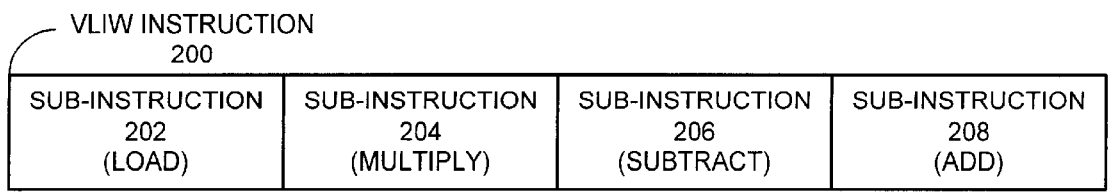
FIG. 2 illustrates a single VLIW instruction in accordance with an embodiment of the present invention.

FIG. 2 illustrates a single VLIW instruction 200 in accordance with an embodiment of the present invention. VLIW instruction 200 includes four sub-instructions 202, 204, 206 and 208. Sub-instruction 202 is a load sub-instruction specifying a load operation for universal functional unit 118. This load operation moves data from DRAM 150 into at least one register within register files 110, 112, 114 and 116. Sub-instruction 204 specifies a multiplication operation for universal functional unit 120. Sub-instruction 206 specifies a subtraction operation for universal functional unit 122. Finally, sub-instruction 208 specifies an addition operation for universal functional unit 124.

Note that although VLIW instruction 200 includes four sub-instructions, in general a VLIW instruction may include any number of sub-instructions.

Pipeline Control Unit

Figure 3:
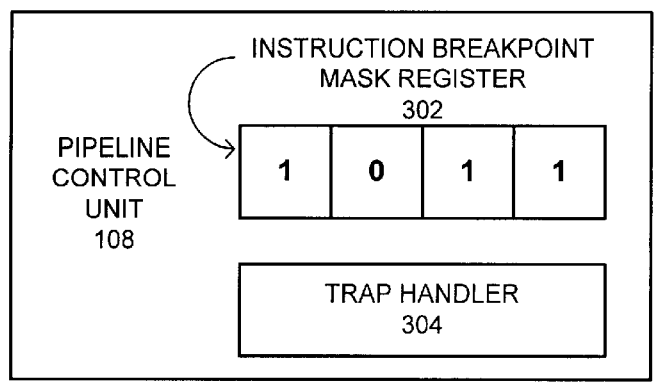
FIG. 3 illustrates part of the internal structure of a pipeline control unit in accordance with an embodiment of the present invention.

FIG. 3 illustrates part of the internal structure of pipeline control unit 108 in accordance with an embodiment of the present invention. Among other circuitry, pipeline control unit 108 includes instruction breakpoint mask register 302 and trap handler 304. Trap handler 304 includes circuitry for handling traps and other exception conditions that arise during execution of VLIW instructions.

Trap handler 304 acts in concert with instruction breakpoint mask register (IBMR) 302. IBMR 302 contains a single bit for each of the universal functional units 118, 120, 122 and 124 in VLIW processor 101. Each bit acts as an enable signal for the corresponding universal functional unit. Hence, when a bit is asserted, the corresponding functional unit is enabled. As illustrated in FIG. 3, IBMR 302 includes four bits, three of which are asserted. This means that when a the corresponding VLIW instruction executes, only three of four universal functional units will be enabled. This selective enablement mechanism allows instructions that are not emulated in software to be executed in hardware as is described below with reference to FIG. 5.

Shadow Registers

Figure 4:
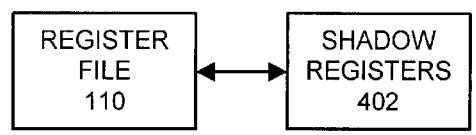
FIG. 4 illustrates how a register file is coupled to shadow registers in accordance with an embodiment of the present invention.

FIG. 4 illustrates how a register file 110 is coupled to shadow registers 402 in accordance with an embodiment of the present invention. In order to improve processor performance, VLIW processor 101 includes shadow registers 402, which are located on the same semiconductor chip as register file 110. During an exception condition, registers within register file 110 or control registers within pipeline control unit 108 can be temporarily saved to shadow registers 402 instead of saving them out to external memory (DRAM 150). This can greatly improve processor performance during exception conditions because saving registers out to external memory typically requires a large number of clock cycles.

Instruction Emulation Process

Figure 5:
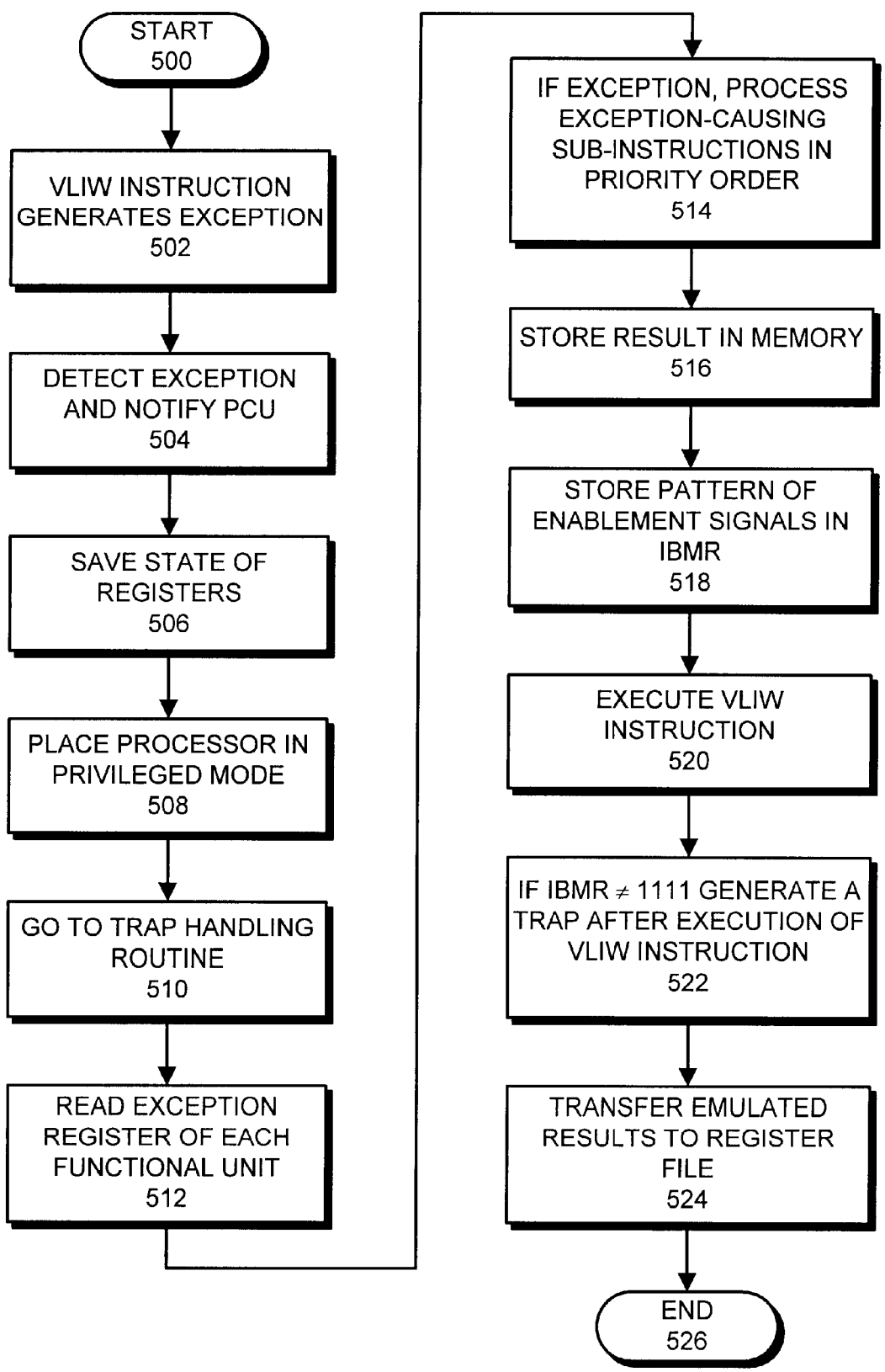
FIG. 5 is a flow chart illustrating the instruction emulation process in accordance with an embodiment of the present invention.

FIG. 5 is a flow chart illustrating the instruction emulation process in accordance with an embodiment of the present invention. During execution of a VLIW program, a VLIW instruction generates an exception condition (step 502). VLIW processor 101 detects this exception condition and notifies pipeline control unit 108 (step 504). In the embodiment of the invention illustrated in FIG. 1, this detection process involves loading at least one of exception registers 126, 128, 130 and 132 with a value indicating the type of exception that occurred. Note that more than one exception can occur for each functional unit at the same time. The contents of exception registers 126, 128, 130 and 132 feed through OR gates 135, 136, 138, 140 and 144 to form exception signal 146, which feeds into pipeline control unit 108. Exception signal 146 will be asserted whenever any bits are set in exception registers 126, 128, 130 and 132.

Next, VLIW processor 101 saves the contents of some registers with register files 110, 112, 114 and 116 (step 506). In one embodiment of the present invention, this is accomplished by writing the registers out to memory. In another embodiment, this is accomplished by writing the registers to "shadow registers" illustrated in FIG. 4. This can greatly reduce the time required to write the registers out to an external memory.

Next, VLIW processor 101 is placed in a privileged mode so that it can access all of the internal registers within VLIW processor 101 in order to process the exception condition (step 508).

The system then goes to a trap handler routine (step 510). In one embodiment of the present invention, this is accomplished by looking up a trap vector, which contains the address of a trap handling routine, and then jumping to the address. At this point trap handling software takes over from the hardware within pipeline control unit 108. This trap handling software may initially store more of the VLIW processor 101's state out to memory or into shadow registers.

Note that processing an exception condition for a VLIW instruction causes all subsequent VLIW instructions to be flushed from the pipeline. Hence, after the exception condition is complete, VLIW processor 101 must reload VLIW instructions starting from the instruction immediately following the VLIW instruction that caused the exception condition.

The trap handling routine next reads the exception register of each universal functional unit (step 512). If a particular sub-instruction caused at least one exception, the system processes the exceptions in order of priority (step 514). In one embodiment of the present invention, this is accomplished by reading an exception register for the universal functional unit associated with the sub-instruction and using the "count consecutive clear bits" (CCCB) instruction to find the highest bit in the exception register that is set. This process identifies the highest priority exception because each bit in the exception register corresponds to a different exception condition, and the bits are mapped into the exception register in priority order. Next, the system jumps a specific handler for the exception condition. For example, if the exception condition requires the sub-instruction to be emulated in software, the system jumps to a piece of code to emulate the sub-instruction. Finally, if other exceptions remain to be processed for the sub-instruction, they are processed in priority order.

Next, the results of the exception condition, if any, are stored out to memory (step 516). For example, if the exception condition caused a sub-instruction to be emulated, the emulation results are written out to memory.

The system next stores a pattern of enablement signals for all of the remaining sub-instructions that have not been emulated into instruction breakpoint mask register (IBMR) 302 within pipeline control unit 108 (step 518). Recall that IBMR 302 contains enablement signals for each of the universal functional units 118, 120, 122 and 124 in the system. Hence, storing the pattern of enablement signals in IBMR 302 causes selected universal functional units to the enabled.

Next, the system executes in hardware the VLIW instruction that caused the exception condition (step 520). Note that since the sub-instructions that caused the exception condition are not enabled, the VLIW instruction should finish executing without generating an exception condition.

Next, if at least one bit of IBMR is equal to zero (or stated conversely if IBMR is not equal to 1111), a trap is generated after execution of the VLIW instruction (step 522). This trap causes the emulated results stored out to memory in step 516 to be retrieved from memory and stored into their destination locations within register files 110, 112, 114 and 116.

The VLIW instruction has now successfully executed and VLIW processor 101 commences executing the next VLIW instruction in the VLIW program.

Note that the discussion above refers to actions carried out by VLIW processor 101. These actions may be carried out under direction of a micro-sequencer or controller for VLIW processor 101, as would be the case for a non-VLIW processor. This micro-sequencer or controller coordinates actions of all of the functional components illustrated in FIG. 1.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for efficiently emulating sub-instructions in a very long instruction word (VLIW) processor, comprising:
   receiving an exception condition during execution of a VLIW instruction within a VLIW program, the exception condition indicating that at least one sub-instruction in the VLIW instruction requires emulation in software;
   emulating in software at least a portion of the at least one sub-instruction and storing a result of the emulation;
   selectively executing in hardware remaining sub-instructions in the VLIW instruction that do not require emulation in software;
   combining the stored result from the at least one sub-instruction emulated in software with results from the remaining sub-instructions executed in hardware; and
   resuming execution of the VLIW program.

2. The method of claim 1, wherein the act of emulating in software at least a portion of the at least one sub-instruction includes:
   saving state from a plurality of registers within the VLIW processor;
   placing the VLIW processor into a privileged mode; and
   activating a trap handler to perform the emulation.

3. The method of claim 2, wherein the act of saving the state from the plurality of registers includes saving the state into a plurality of shadow registers located in on the same semiconductor chip as the plurality of registers.

4. The method of claim 2, wherein the act of activating the trap handler includes:
   reading an exception register that indicates which of the sub-instructions caused the exception condition; and
   emulating the sub-instructions that caused the exception condition in order of priority.

5. The method of claim 1, wherein the act of selectively executing in hardware the remaining sub-instructions includes:
   enabling execution of the remaining sub-instructions that do not have to be emulated;
   executing the VLIW instruction so that only the remaining sub-instructions which have been enabled are executed; and
   generating a trap after the VLIW instruction is executed in order to proceed with processing the exception condition.

6. The method of claim 5, wherein the act of enabling execution of the remaining sub-instructions comprises:
   storing a pattern of enablement signals into an enablement register, each bit of the enablement register indicating whether a corresponding sub-instruction is to be enabled; and
   applying the pattern of enablement signals from the enablement register to hardware functional units in the VLIW processor so that the hardware functional units will execute only the enabled sub-instructions.

7. The method of claim 1, where the act of combining the stored result from the at least one sub-instruction emulated in software includes transferring the result for the at least one sub-instruction into a register file in the VLIW processor.

8. The method of claim 1, wherein the act of emulating in software the at least one sub-instruction occurs after the act of selectively emulating in hardware the remaining sub-instructions.

9. The method of claim 1, wherein each sub-instruction in the VLIW instruction controls a different hardware functional unit that performs computational operations in the VLIW processor.

10. The method of claim 1, wherein the act of emulating in software at least a portion of the at least one sub-instruction includes processing an exception condition for the at least one sub-instruction.

11. A method for efficiently emulating sub-instructions in a very long instruction word (VLIW) processor, comprising:
    receiving an exception condition during execution of a VLIW instruction within a VLIW program, the exception condition indicating that at least one sub-instruction in the VLIW instruction requires emulation in software;
    emulating in software at least a portion of the at least one sub-instruction and storing a result of the emulation, wherein the act of emulating includes,
       saving state from a plurality of registers within the VLIW processor,
       placing the VLIW processor into a privileged mode,
       reading an exception register that indicates which of the sub-instructions caused the exception condition, and
       emulating the sub-instructions that caused the exception condition in order of priority;
    storing a pattern of enablement signals into an enablement register, each bit of the enablement register indicating whether a corresponding sub-instruction is to be enabled;
    applying the pattern of enablement signals from the enablement register to hardware functional units in the VLIW processor so that the hardware functional units will execute only the enabled sub-instructions;
    executing the VLIW instruction so that only the remaining sub-instructions which have been enabled are executed;
    generating a trap after the VLIW instruction is executed in order to proceed with processing the exception condition;
    combining the stored result from the at least one sub-instruction emulated in software with results from the remaining sub-instructions emulated in hardware; and
    resuming execution of the VLIW program.

12. An apparatus that efficiently emulates sub-instructions in a very long instruction word (VLIW) instruction, comprising:
    a VLIW processor for executing a VLIW program containing the VLIW instruction;
    an exception generation mechanism, that is configured to generate an exception during execution of the VLIW instruction if at least one sub-instruction of the VLIW instruction requires emulation in software;

an emulation mechanism that is configured to emulate at least a portion of the at least one sub-instruction in software and to store a result of the emulation;

an enablement mechanism that is configured to selectively enable hardware functional units within the VLIW processor to execute remaining sub-instructions in the VLIW instruction that do not require emulation in software; and a combining mechanism that is configured to combine the stored result from the at least one sub-instruction emulated in software with results from the remaining sub-instructions executed in hardware.

13. The apparatus of claim 12, wherein the emulation mechanism is configured to:

save state from a plurality of registers within the VLIW processor;

place the VLIW processor into a privileged mode; and activate a trap handler to perform the emulation.

14. The apparatus of claim 13, further comprising a plurality of shadow registers, located in on the same semiconductor chip as the plurality of registers, for saving state information from the plurality of registers.

15. The apparatus of claim 13, wherein the emulation mechanism is further configured to:

read an exception register that indicates which of the sub-instructions caused the exception condition; and to emulate the sub-instructions that caused the exception in order of priority.

16. The apparatus of claim 12, further comprising a trap generating mechanism that is configured to generate a trap after the VLIW instruction has executed the remaining sub-instruction s in the VLIW instruction that do not require emulation in software.

17. The apparatus of claim 16, wherein the enablement mechanism is configured to:

store a pattern of enablement signals into an enablement register, each bit of the enablement register indicating whether a corresponding sub-instruction is to be enabled; and to apply the pattern of enablement signals from the enablement register to a plurality of hardware functional units in the VLIW processor so that the plurality of hardware functional units will execute only the enabled sub-instructions.

18. The apparatus of claim 12, where the combining mechanism is configured to transfer the result for the at least one sub-instruction emulated in software into a register file in the VLIW processor.

19. The apparatus of claim 12, wherein each sub-instruction in the VLIW instruction controls a different hardware functional unit that performs computational operations in the VLIW processor.

20. The apparatus of claim 12, wherein the emulation mechanism is configured to process an exception condition for the at least one sub-instruction.

21. An apparatus that efficiently emulates sub-instructions in a very long instruction word (VLIW) instruction, comprising:

a VLIW processor for executing a VLIW program containing the VLIW instruction;

an exception generation mechanism, that is configured to generate an exception during execution of the VLIW instruction if at least one sub-instruction of the VLIW instruction requires emulation in software;

an emulation mechanism that is configured to emulate at least a portion of the at least one sub-instruction in software and to store a result of the emulation, wherein the emulation mechanism is configured to, save state from a plurality of registers within the VLIW processor, place the VLIW processor into a privileged mode, read an exception register that indicates which of the sub-instructions caused the exception condition, and emulate the sub-instructions that caused the exception condition in order of priority;

an enablement mechanism that is configured to selectively enable hardware functional units within the VLIW processor to execute only remaining sub-instructions in the VLIW instruction that do not require emulation in software, wherein the enablement mechanism is configured to, store a pattern of enablement signals into an enablement register, each bit of the enablement register indicating whether a corresponding sub-instruction is to be enabled, and to apply the pattern of enablement signals from the enablement register to the hardware functional units in the VLIW processor so that the hardware functional units will execute only the enabled sub-instructions;

a trap generating mechanism that is configured to generate a trap after the VLIW instruction has executed the remaining sub-instructions in the VLIW instruction that do not require emulation in software; and a combining mechanism that is configured to combine the stored result from the at least one sub-instruction emulated in software with results from the remaining sub-instructions executed in hardware.

22. An computer system that efficiently emulates sub-instructions in a very long instruction word (VLIW) instruction, comprising:

a secondary storage device;

a VLIW processor for executing a VLIW program containing the VLIW instruction;

an exception generation mechanism, within the VLIW processor, that is configured to generate an exception during execution of the VLIW instruction if at least one sub-instruction of the VLIW instruction requires emulation in software;

an emulation mechanism, within the VLIW processor, that is configured to emulate at least a portion of the at least one sub-instruction in software and to store a result of the emulation;

an enablement mechanism, within the VLIW processor, that is configured to selectively enable hardware functional units within the VLIW processor to execute only remaining sub-instructions in the VLIW instruction that do not require emulation in software; and a combining mechanism, within the VLIW processor, that is configured to combine the stored result from the at least one sub-instruction emulated in software with results from the remaining sub-instructions executed in hardware.

* * * * *